US012264808B2

United States Patent
Jiang

(10) Patent No.: US 12,264,808 B2
(45) Date of Patent: Apr. 1, 2025

(54) STAGE LIGHT FIXTURE WITH UNIVERSAL SUPPORT ARM

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/345,560

(22) Filed: Jun. 30, 2023

(65) Prior Publication Data
US 2024/0401785 A1  Dec. 5, 2024

(30) Foreign Application Priority Data

May 31, 2023 (CN) .......................... 202321376560.8

(51) Int. Cl.
 *F21V 21/116* (2006.01)
 *F16M 11/04* (2006.01)
 (Continued)

(52) U.S. Cl.
 CPC ............ *F21V 21/116* (2013.01); *F21V 21/29* (2013.01); *F16M 11/041* (2013.01); *F21S 2/005* (2013.01);
 (Continued)

(58) Field of Classification Search
 CPC ... F21W 2131/406; F21S 2/005; F21V 21/06; F21V 21/14; F21V 21/15; F21V 21/26;
 (Continued)

(56) References Cited

U.S. PATENT DOCUMENTS 4,727,460 A 2/1988 Payne
6,953,270 B1 10/2005 Richardson
(Continued)

FOREIGN PATENT DOCUMENTS

CN 217109229 U 8/2022
CN 217843777 U 11/2022
(Continued)

OTHER PUBLICATIONS

Machine translation of EP 2108877 A2 retrieved from the FIT database of PE2E search. (Year: 2023).*

*Primary Examiner* — Colin J Cattanach
(74) *Attorney, Agent, or Firm* — MUNCY, GEISSLER, OLDS & LOWE, P.C.

(57) ABSTRACT

The present invention relates to the technical field of stage light fixtures, in particular to a stage light fixture having a universal support arm, which includes a supporting arm rotatably supported on a bottom base, the supporting arm having a universal frame of an integrally formed structure and an adapter detachably connected to the universal frame and a light head rotatably disposed at the adapter via a rotating shaft, a light source being disposed in the light head. The present invention is advantageous to improve the mounting accuracy and overall structural strength of the movable support of a light head, simplify the assembly process of the movable support of the light head, and contribute to standardize the production of the movable support of the light head.

11 Claims, 11 Drawing Sheets

(51) Int. Cl.
  *F21S 2/00* (2016.01)
  *F21V 21/06* (2006.01)
  *F21V 21/14* (2006.01)
  *F21V 21/15* (2006.01)
  *F21V 21/26* (2006.01)
  *F21V 21/28* (2006.01)
  *F21V 21/29* (2006.01)
  *F21V 21/30* (2006.01)
  *F21W 131/406* (2006.01)

(52) U.S. Cl.
  CPC ............ *F21V 21/06* (2013.01); *F21V 21/14* (2013.01); *F21V 21/15* (2013.01); *F21V 21/26* (2013.01); *F21V 21/28* (2013.01); *F21V 21/30* (2013.01); *F21W 2131/406* (2013.01)

(58) Field of Classification Search
  CPC .......... F21V 21/28; F21V 21/29; F21V 21/30; F16M 11/041
  See application file for complete search history.

(56) References Cited

U.S. PATENT DOCUMENTS

| | | | | |
|---|---|---|---|---|
| 7,699,506 | B2 * | 4/2010 | Andersen | F21V 7/22 362/345 |
| 7,874,709 | B1 * | 1/2011 | Beadle | F21S 8/022 362/427 |
| 10,969,087 | B1 * | 4/2021 | Jiang | H05B 47/175 |
| 2004/0070984 | A1 * | 4/2004 | Smith | F21V 21/15 362/427 |
| 2014/0172979 | A1 | 6/2014 | El-Beltagy et al. | |
| 2014/0177258 | A1 * | 6/2014 | Gebhard | B60Q 1/245 362/547 |
| 2016/0109079 | A1 * | 4/2016 | McKinley | F21S 8/085 362/89 |
| 2021/0108782 | A1 | 4/2021 | Todd | |

FOREIGN PATENT DOCUMENTS

| | | | | |
|---|---|---|---|---|
| EP | 2108877 A2 * | 10/2009 | | F16M 11/04 |
| WO | WO2014/172979 A1 | 10/2014 | | |

* cited by examiner

STAGE LIGHT FIXTURE WITH UNIVERSAL SUPPORT ARM

CROSS REFERENCE TO RELATED APPLICATIONS

The present application claims priorities from Chinese Application No. CN 202321376560.8 filed on May 31, 2023, all of which are hereby incorporated herein by reference.

TECHNICAL FIELD

The present invention relates to the technical field of stage light fixtures, and more particularly, relates to a stage light fixture with a universal support arm.

BACKGROUND

In the field of stage lighting, various stage light fixtures are often used to achieve stage effects required for the performance, such as the widely used moving head light fixtures. The existing stage light fixture generally includes a fixed case as a base, a movable support rotatably connected to the fixed case, and a light head of the stage light fixture rotatably connected to the movable support, thereby achieving multi-angle projection of stage lighting.

However, the existing movable support of the stage light fixture is typically formed by splicing metal plates. The movable support of the light head directly formed by splicing metal plates may have low processing accuracy and large size errors, resulting in low overall mounting accuracy of the stage light fixtures. In addition, the movable support of the light head produced in such method will has weak overall connection strength. Meanwhile, the processing of splicing metal plates is complex with a large number of parts, which thus is not conducive to achieving automated assembly line production and directly affects production standardization of the movable support of the light head.

SUMMARY

It is the object of the present invention to provide a stage light fixture with a universal support arm, which is advantageous to improve the mounting accuracy and overall structural strength of the movable support of the light head, simplify the assembly process of the movable support of the light head, and contribute to standardize the production of the movable support of the light head.

The stage light fixture according to the present invention includes a supporting arm which is rotatably supported on a bottom base, the supporting arm having a universal frame of an integrally formed structure and an adapter detachably connected to the universal frame, and a light head which is rotatably disposed at the adapter via a rotating shaft, a light source being disposed in the light head.

According to the stage light fixture of the present invention, the adapter is designed to be detachably arranged on the universal frame, so that the light head in different types can be adapted to the frame by replacing the adapter with different heights, thus realizing standardization and universalization of the stage light fixture. In addition, due to manufacturing in an integral forming way, the universal frame thus can be assembled as a single unit. Such configuration can significantly reduce the number of parts compared to the way of splicing multiple pieces of metal plates, making the assembly process simpler and with fewer steps, while making the obtained the support arm much stronger in structure and more accurate in dimension, which is more conducive to standardizing the production of the support arm.

According to an embodiment of the present invention, the rotating shaft is provided on the light head, and a shaft sleeve fitting with the rotating shaft is provided on the adapter.

According to an embodiment of the present invention, the adapter may be provided with a bushing bore, and an annular mounting reference plane fitting with the outer side wall of the shaft sleeve is formed on the inner wall of the bushing bore.

According to an embodiment of the present invention, the shaft sleeve may be detachably fixed to the adapter.

According to an embodiment of the present invention, the length of the shaft sleeve is adjustable in the direction of the rotating shaft.

According to an embodiment of the present invention, the universal frame includes a transverse frame plate which is pivoted to the bottom base of the stage light fixture, and longitudinal frame plates, disposed on both sides of the transverse frame plate. The adapter is detachably disposed on the longitudinal frame plate in the length direction of the longitudinal frame plate.

The adapter is preferable in an integrally formed structure according to the present invention.

According to one embodiment of the present invention, a first mounting reference plane, a second mounting reference plane, and a third mounting reference plane which are perpendicular to each other in the three-dimensional space are formed on the support arm; a first butt joint plane, a second butt joint plane, and a third butt joint plane which are perpendicular to each other in the three-dimensional space are formed on the adapter; and wherein the first butt joint plane is in butt joint with the first mounting reference plane in parallel, the second butt joint plane is in butt joint with the second mounting reference plane in parallel, and the third butt joint plane is in butt joint with the third mounting reference plane in parallel.

Further, the end of the universal frame has mounting plates perpendicular to the direction of the axis of rotation of the universal frame relative to the bottom base, the first mounting reference plane is formed on the plate surface of the mounting plate; the first limiting step is projected vertically from both ends of the plate surface of the mounting plate, the second mounting reference plane is formed on the inner side surface of the first limiting step; and the end of the universal frame has second limiting steps extending in a direction close to the bottom base, the top surface of the second limiting step is parallel to the direction of the axis of rotation of the arm relative to the bottom base, and the third mounting reference plane is formed on the top surface of each second limiting step.

Furthermore, the bottom of the adapter has a third limiting step extending vertically in a direction away from the adapter, the first butt joint plane and the second butt joint plane are respectively formed on the step end surface and the step outer side surface of the third limiting step, the step end surface of the third limiting step has a vertical plate extending vertically in the direction close to the bottom base, and the third butt joint plane is formed on the plate surface of the vertical plate.

According to the present invention, the universal frame of integrally molded structure may be molded by casting, turn milling or 3D printing.

DESCRIPTION OF THE DRAWINGS

To describe the technical solutions in the present invention or in the prior art more clearly, the following briefly introduces the accompanying drawings for describing the embodiments or the prior art. Apparently, the accompanying drawings in the following description show some embodiments of the present invention, and a person of ordinary skill in the art may still derive other drawings from the accompanying drawings without creative efforts.

In the drawings.

DETAILED DESCRIPTION

Figure 1:
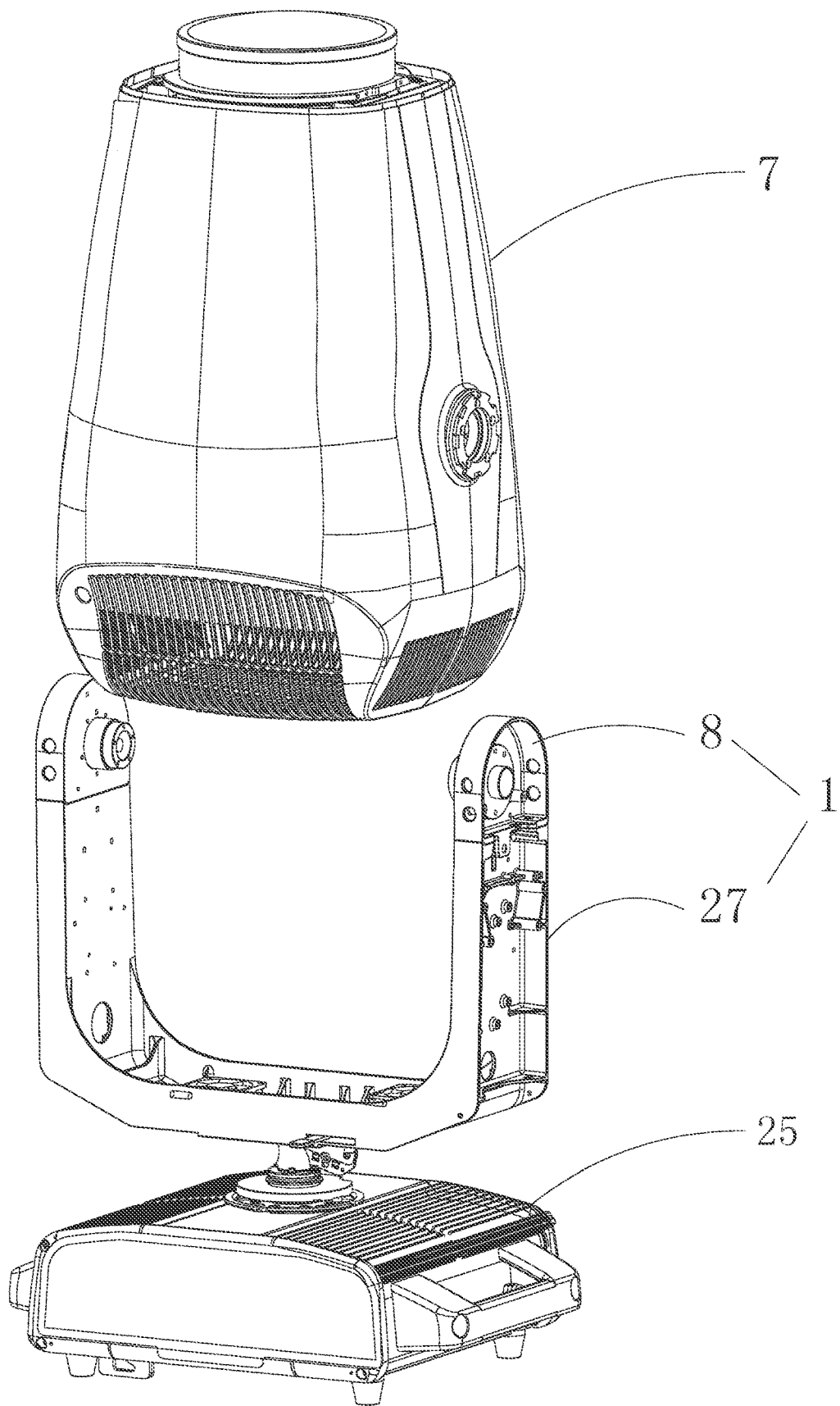
FIG. 1 is an exploded view of a stage light fixture according to an embodiment of the present invention.

Embodiments of the present invention will be described in detail below, and examples of the embodiments are illustrated in the accompanying drawings, wherein same or similar reference numerals refer to the same or similar elements or elements with the same or similar function throughout the description. The embodiments described below with reference to the accompanying drawings are exemplary and are intended to explain the present invention and are not to be construed as limiting the present invention. In the description of the present invention, it should be understood that, orientation or position relationships indicated by terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", and "circumferential" are orientation or position relationship shown based on the accompanying drawings, and are merely used for describing the present invention and simplifying the description, rather than indicating or implying that the mentioned apparatus or element has to have a particular orientation or be constructed and operated in a particular orientation, and therefore, should not be construed as a limitation to the present invention.

FIG. 1 depicts a stage light fixture having a universal support arm according to an embodiment, which includes a support arm 1 arranged on a bottom base 25 of the stage light fixture and a light head 7 for disposing a light source. The support arm 1 includes an adapter 8 and a universal frame 27. The light head 7 has a rotating shaft and is rotatably mounted on the universal frame 27 via the rotating shaft. The adapter 8 is of an integrally formed structure and is detachably mounted on the universal frame 27. In this embodiment, the adapter 8 is provided with a shaft sleeve 4 associated with the rotating shaft, the light head 7 and the universal frame 27 thus is rotatable connected with the cooperation of the rotating shaft and the shaft sleeve 4.

According to a preferable embodiment, the adapter 8 is adjustable, which can have different heights. Alternatively, a plurality of adapters 8 having different heights may be provided.

The universal frame 27 is also in an integrally formed structure. Alternatively, except to fixed to the adapter 8, the shaft sleeve 4 may also be fixed to the light head 7.

The universal frame 27 can be integrally formed selectively by casting, turn milling, or 3D printing. It can be appreciated that all other known methods that can realize integrally formed structure may be used.

According to the embodiment, the adapter 8 is designed to be detachably arranged on the universal frame 27, so that the light head 7 in different types can be adapted to the frame 27 by replacing the adapter 8 with different heights or by adjusting the height of the adapter 8, thus realizing standardization and universalization of the stage light fixture. In addition, due to manufacturing in an integral forming way, the universal frame 27 thus can be assembled as a single unit. Such configuration can significantly reduce the number of parts compared to the way of splicing multiple pieces of metal plates, making the assembly process simpler and with fewer steps, while making the obtained the support arm 1 much stronger in structure and more accurate in dimension, which is more conducive to standardizing the production of the support arm 1.

Figure 2:
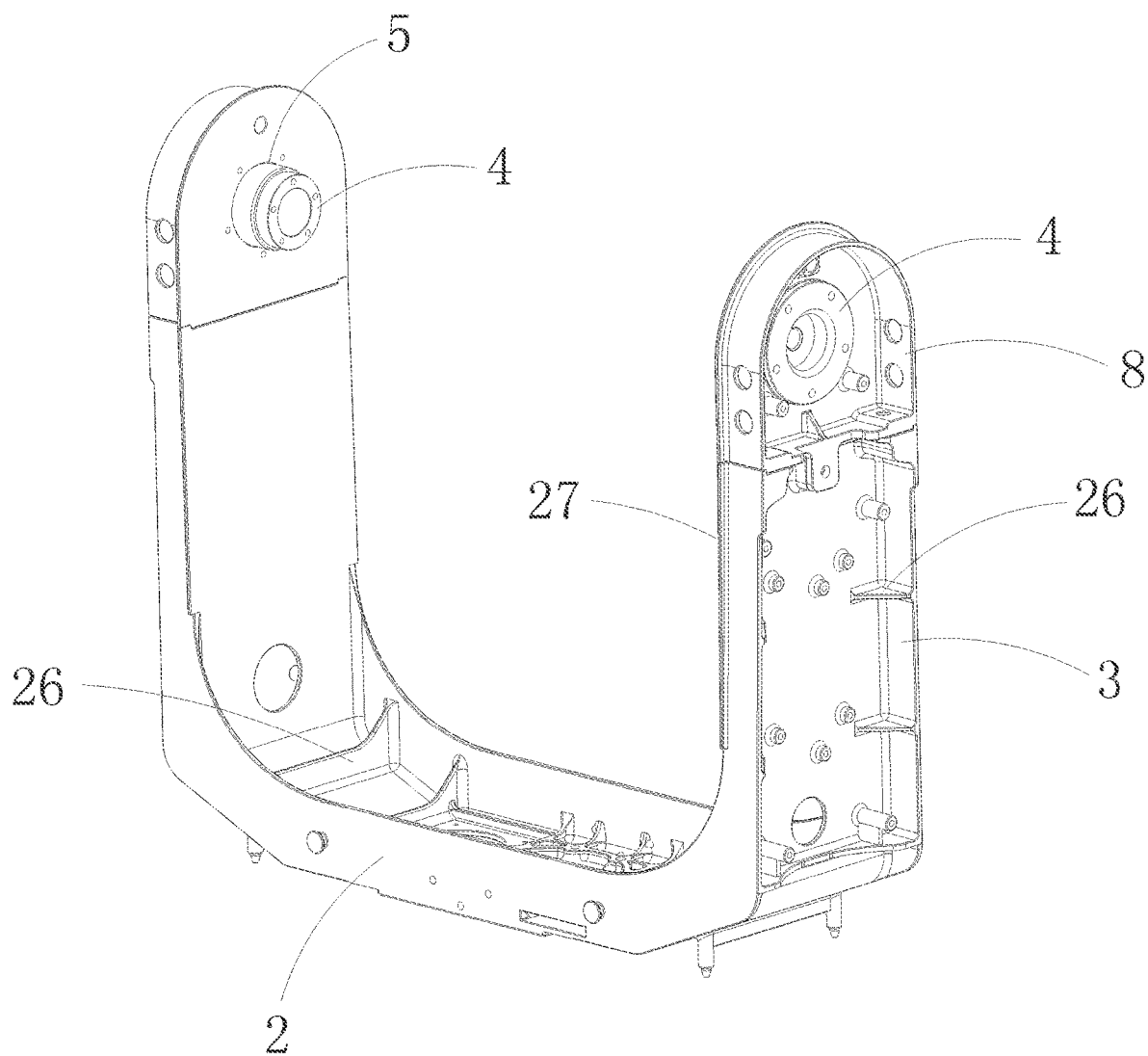
FIG. 2 is a view of an overall structure of a movable universal support arm of a light head according to an embodiment of the present invention.
Figure 3:
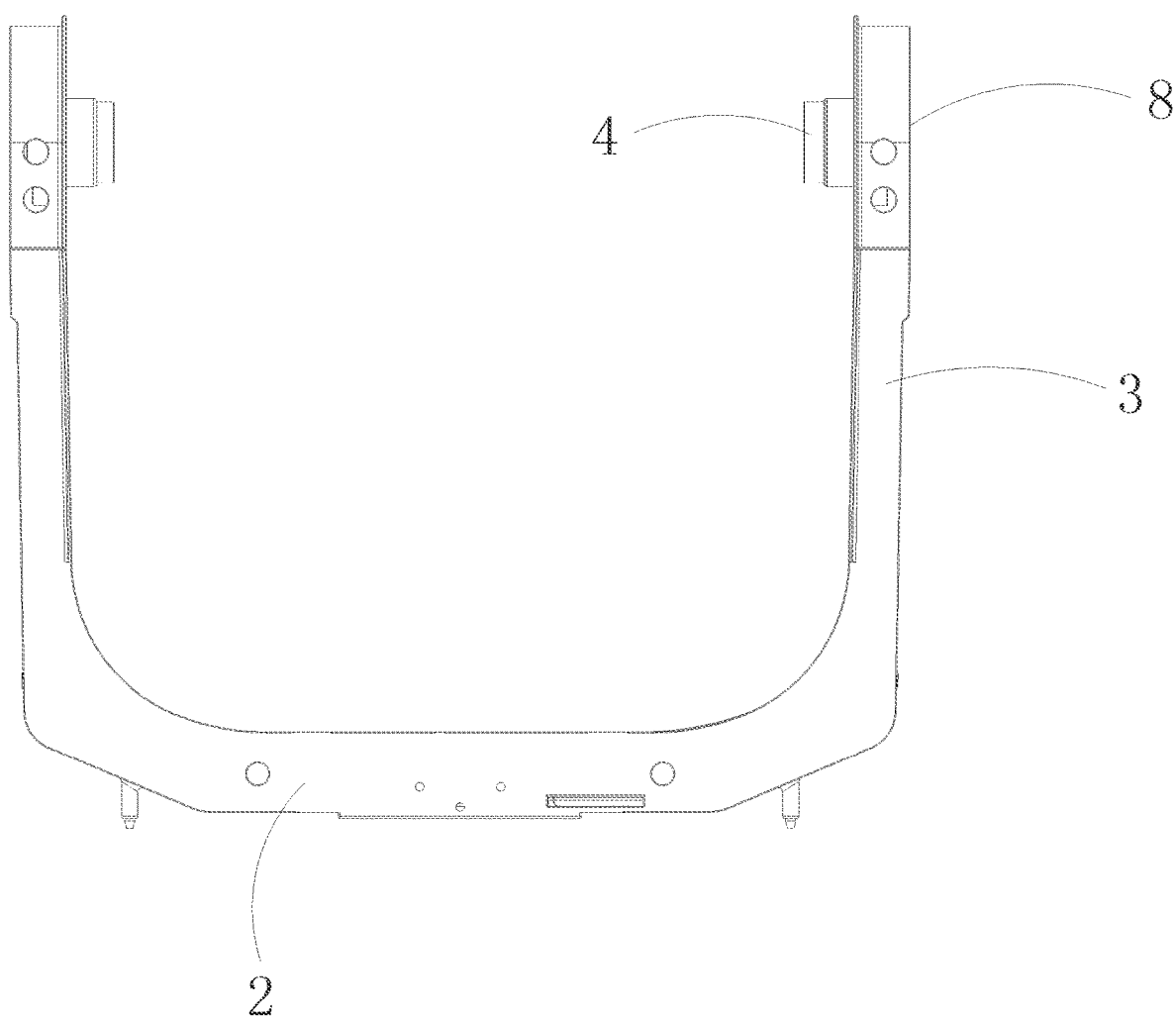
FIG. 3 is a front view of the movable universal support arm of FIG. 2.

Referring to FIGS. 2 and 3, the universal frame 27 specifically includes a transverse frame plate 2 and longitudinal frame plates 3 according to an embodiment. In this embodiment, the transverse frame plate 2 pivotably supported on the base case 25, the longitudinal frame plates 3 are integrally formed on the transverse frame plate 2, and the adapter 8 is detachably mounted on each of the longitudinal frame plates 3 in the length direction of the longitudinal frame plate 3. In such configuration, the universal frame 27 facilitates rotatably mounting on the base case 25, and the longitudinal frame plate 3 can effectively support the light head 7 through the respective adapter 8.

Figure 10:
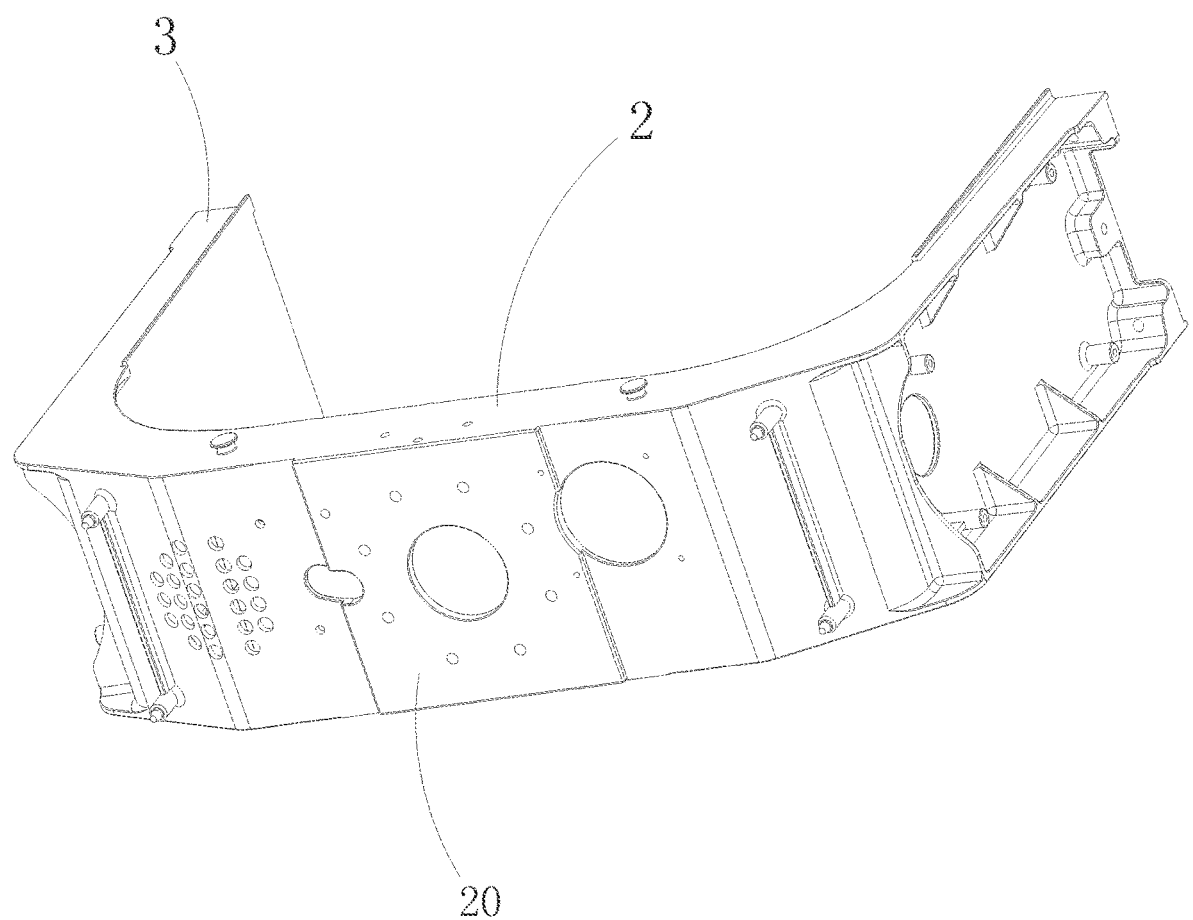
FIG. 10 is a bottom perspective view of the universal support frame according to an embodiment of the present the invention.

In combination with FIG. 10, an assembly reference plane 20 is integrally formed at the bottom of the transverse frame plate 2, which can avoid lowered mounting accuracy due to uneven plate surface caused by splicing metal plates.

Figure 4:
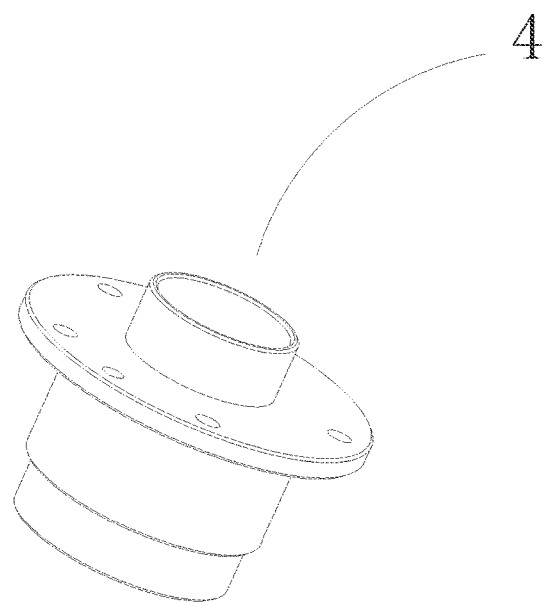
FIG. 4 is a structural view of a fixed shaft sleeve according to an embodiment of the present invention.
Figure 5:
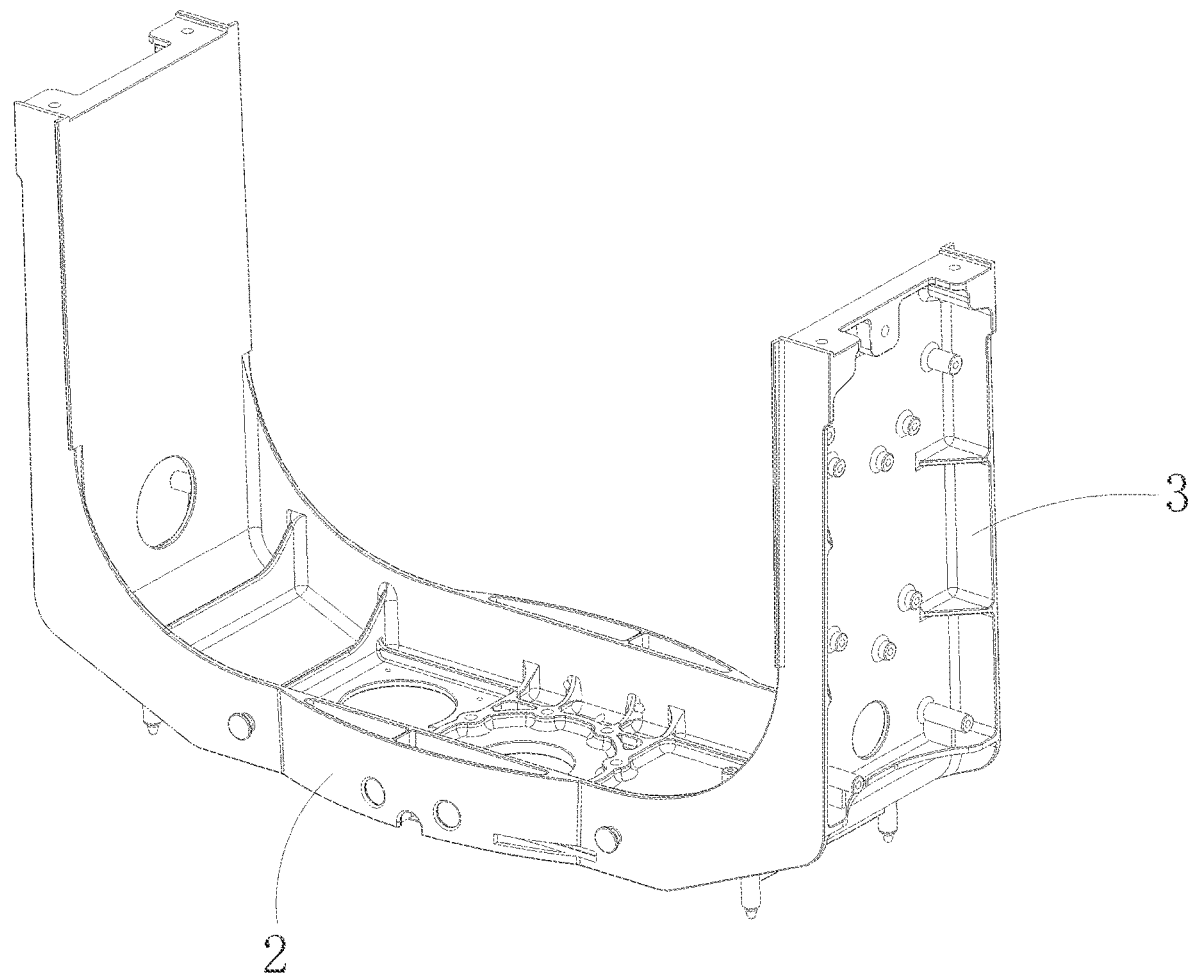
FIG. 5 is a structural view of the universal support frame according to an embodiment of the present invention.

As shown in FIGS. 2-4, the number of the shaft sleeve 4 can be two, and each shaft sleeve 4 may be designed into various lengths or may be adjustable in height. During assembling the stage light fixture, the two longitudinal frame plates 3 are located on both sides of the light head 7, the two adapters 8 are respectively mounted on the longitudinal frame plate 3, and the shaft sleeve 4 in different height can be selected to connect between the light head and the adapter 8 of the stage light fixture to adapt to light heads of the stage light fixture in different types. That is to say, such way can ensure that the light head of the stage light fixture in different width sizes can be smoothly mounted in the universal frame 27 by replacing with or adjusting the shaft sleeve 4 in appropriate length according to the width size of the light head of the stage light fixture in need. Therefore, assembly of the light fixture in this embodiment is more flexible and convenient, making the movable support arm of the light head more universal.

In other embodiment, the number of the shaft sleeve 4 may be at least one.

Figure 6:
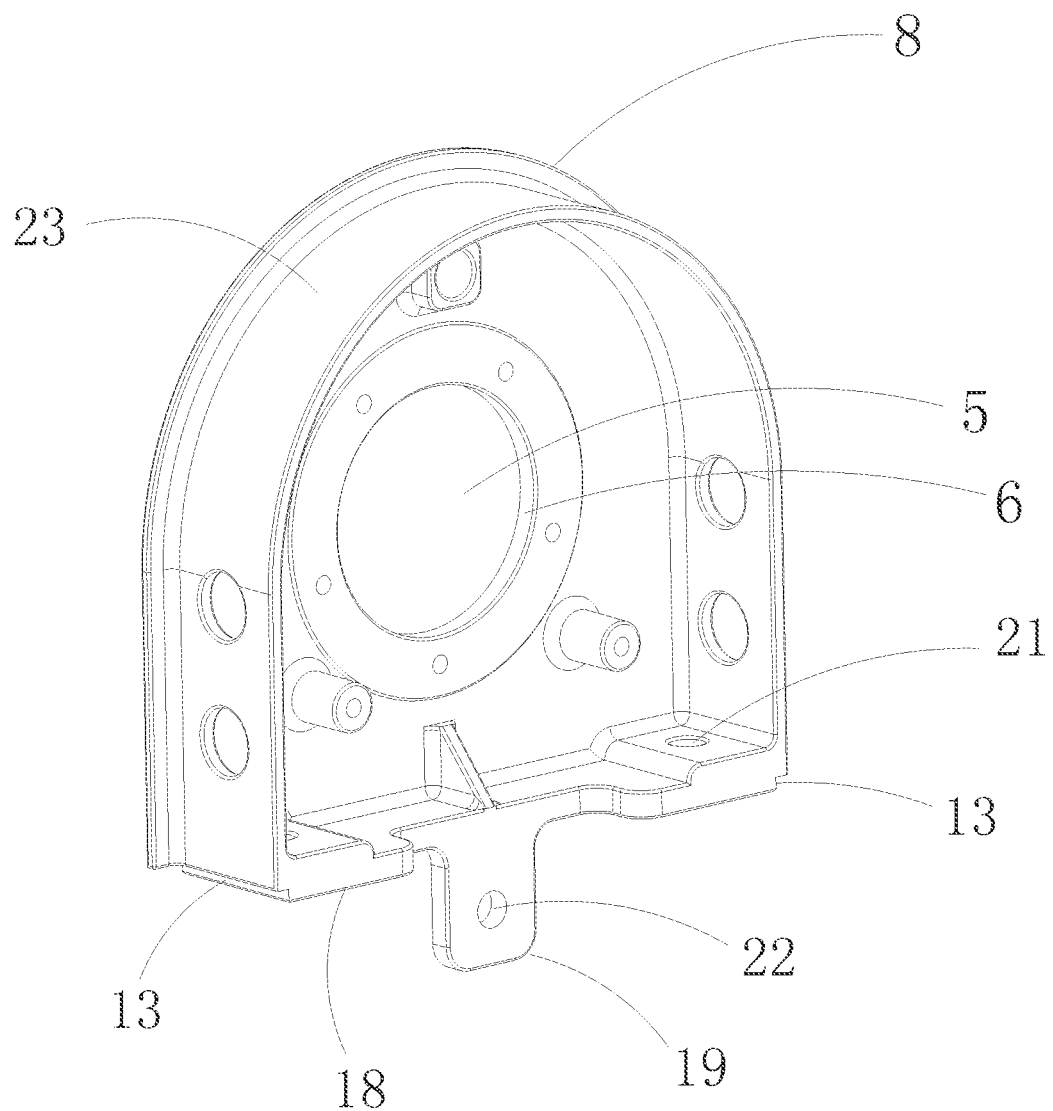
FIG. 6 is a structural view of an adapter according to an embodiment of the present the invention.
Figure 7:
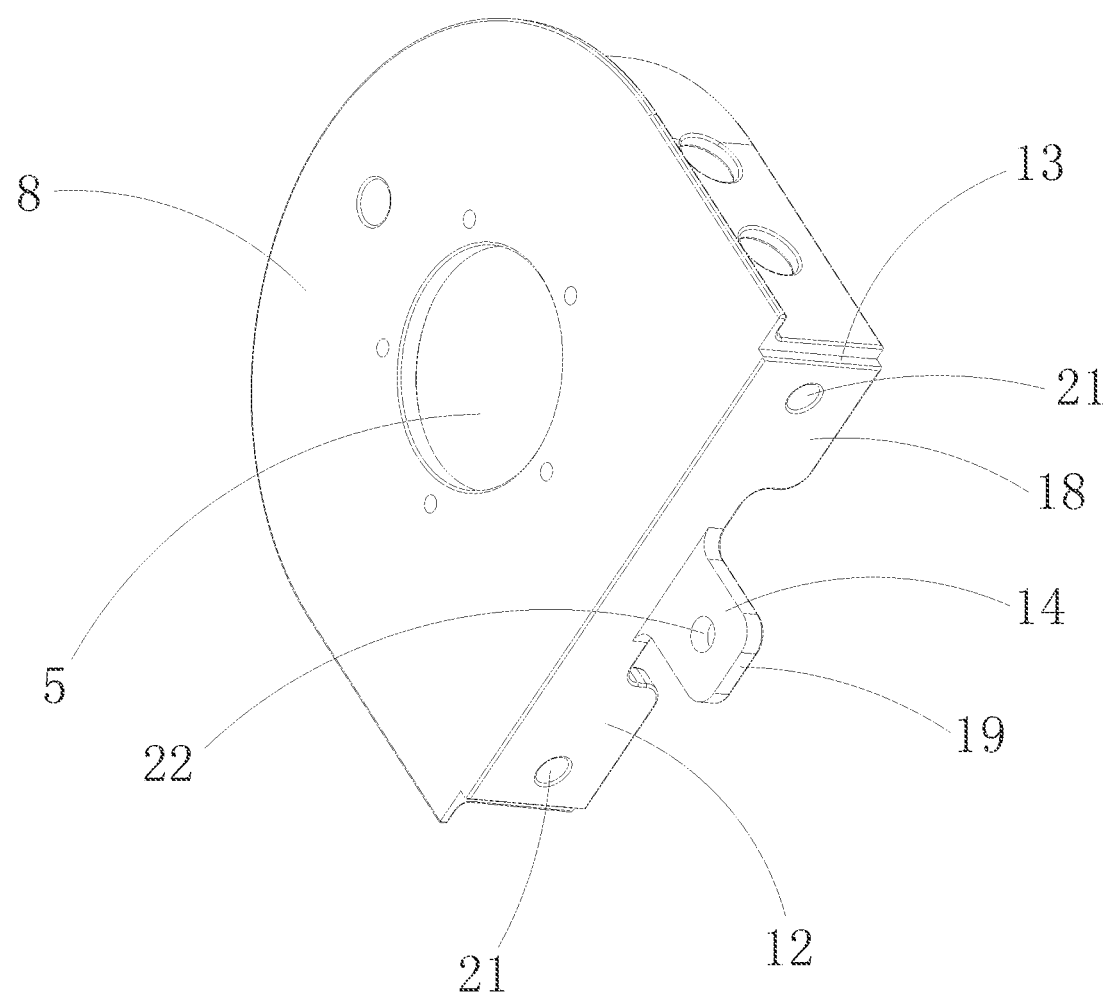
FIG. 7 is a rear perspective view of the adapter of FIG. 6.

FIGS. 6 and 7 shows the structure of the adapter 8. Each adapter 8 is provided with a bushing bore 5, and an annular mounting reference plane 6 is formed on the inner wall of the bushing bore 5. The annular mounting reference plane 6 is fine machined, which is suitable for fitting with the shaft sleeve 4 in a sleeved way. When the two adapters 8 are arranged on the left and right sides of the light head 7, the two annular mounting reference planes 6 arranged on two opposite sides of the light head 7 coaxially correspond to each other. In such configuration, it can effectively ensure the coaxial accuracy of the shaft sleeves 4 on the left and right sides when assembled on the universal frame 27 and also effectively improve the smooth rotation of the light head 7 on the shaft sleeve 4.

Additionally, in order to ensure the coaxiality of the bushing bore 5 and the shaft sleeve 4, the adapter 8 is provided with at least one positioning hole on the outer side of the circumference of the bushing bore 5, and the shaft sleeve 4 is also cooperatively provided with a threaded hole corresponding to the positioning hole.

According to an embodiment, the number of the adapter 8 is multiple, and the support heights of each adapter 8 in the length direction of the longitudinal frame plate 3 are different from each other, so that the adapters 8 with different support heights are selectively connected to the longitudinal frame plate 3 to adapt to the light head of different height sizes. That is to say, in such way, the light heads 7 of different height sizes can be mounted smoothly by selecting adapter 8 of suitable support height according to the height size of the light head 7, so that the assembly of the light fixture can be more flexible and convenient, thereby making the movable support arm of the light head more universal.

Figure 8:
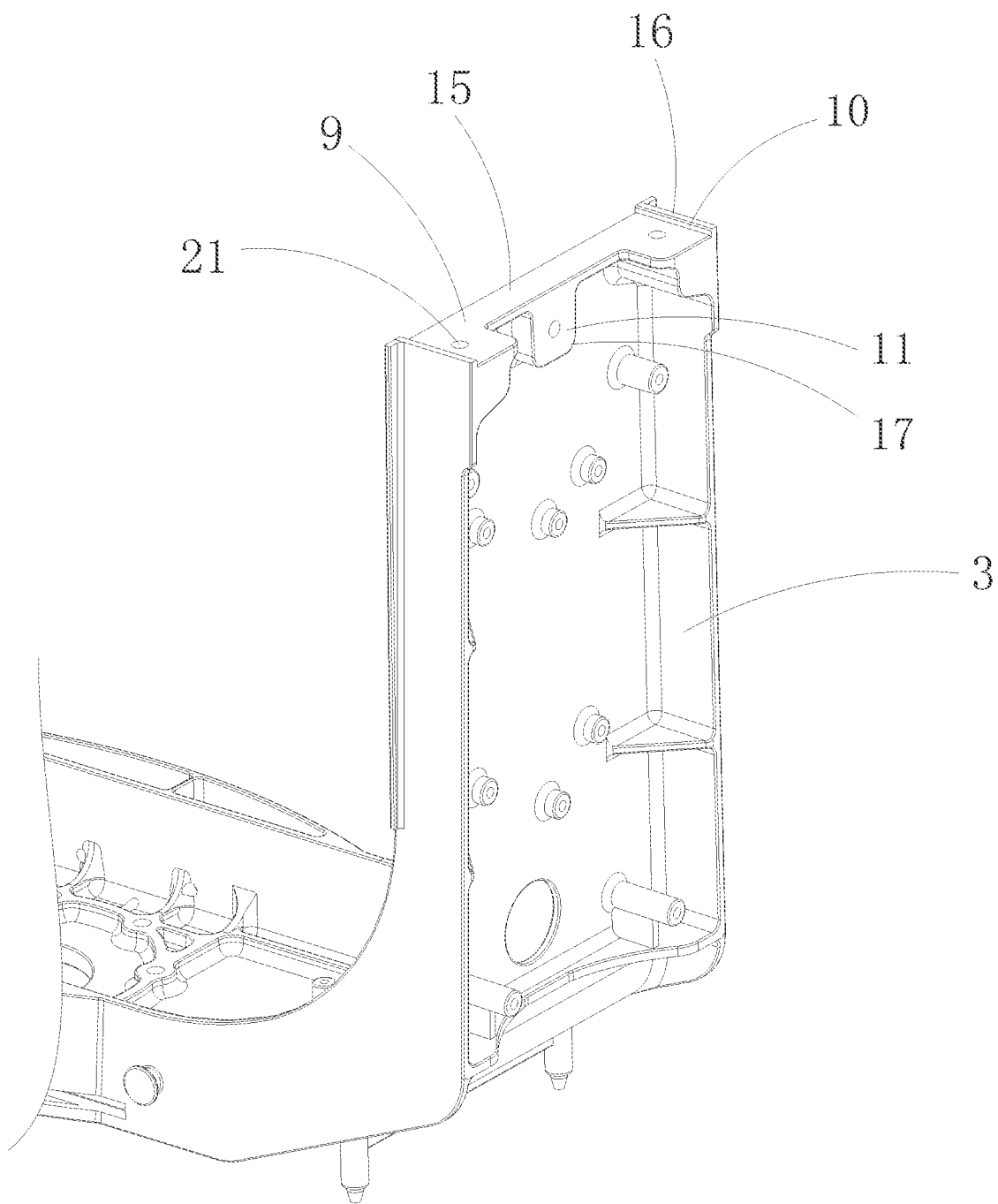
FIG. 8 is a partial enlarged view of the universal support frame of FIG. 5.
Figure 9:
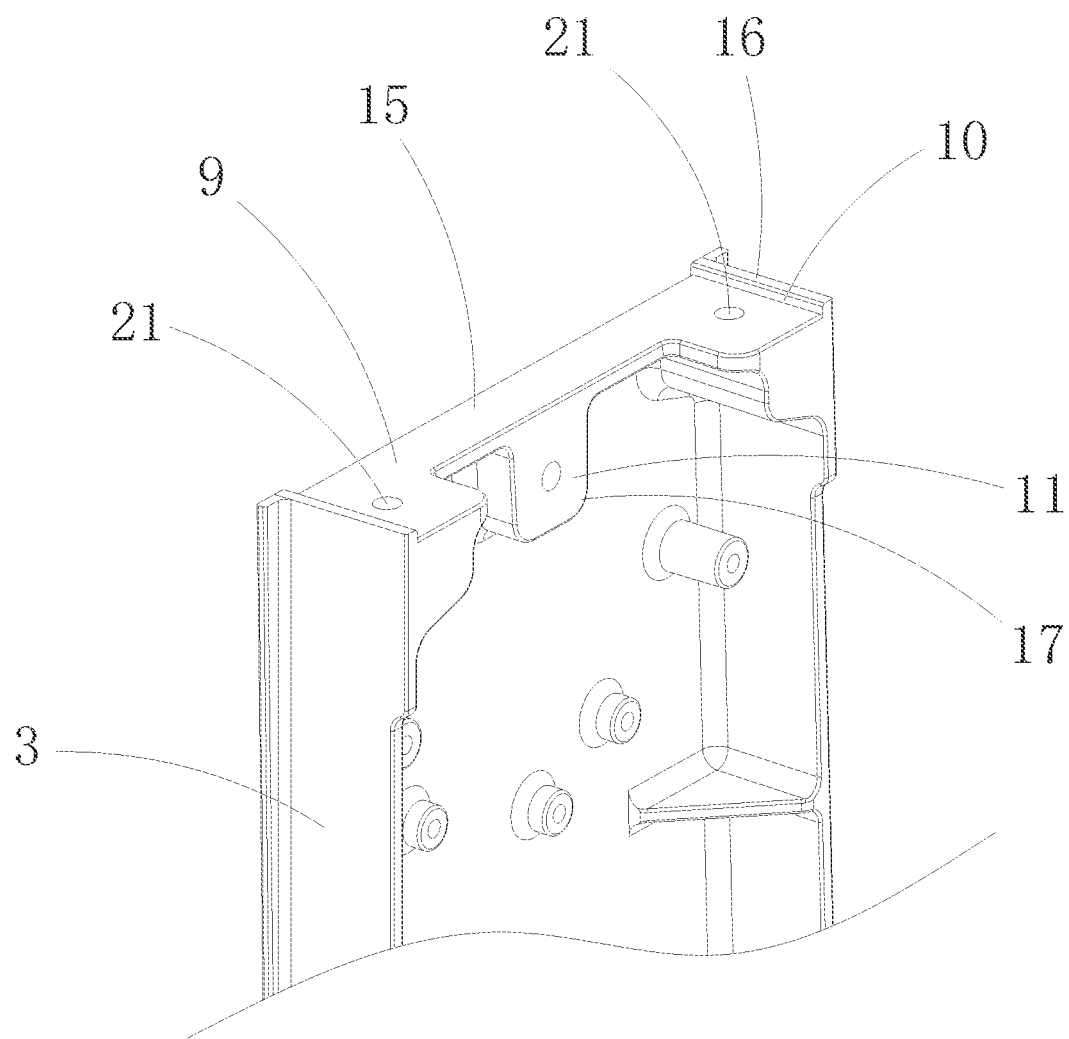
FIG. 9 is another partial enlarged view of the universal support frame of FIG. 5.

As shown in FIG. 8 and FIG. 9, according to an embodiment, a first mounting reference plane 9, a second mounting reference plane 10 and a third mounting reference plane 11 which are fine machined are respectively formed on each of the longitudinal frame plates 3 on the left and right sides of the light head 7, and the first mounting reference plane 9, the second mounting reference plane 10 and the third mounting reference plane 11 are perpendicular to each other in the three-dimensional space. On the other hand, as shown in FIGS. 6 and 7, a first butt joint plane 12, a second butt joint plane 13 and a third butt joint plane 14 which are fine machined are formed on each adapter 8, and the first butt joint plane 12, the second butt joint plane 13 and the third butt joint plane 14 are also perpendicular to each other in the three-dimensional space. When the corresponding adapters 8 are mounted on the respective longitudinal frame plates 3, the first butt joint plane 12 is in butt joint with the first mounting reference plane 9 in parallel, the second butt joint plane 13 is in butt joint with the second mounting reference plane 10 in parallel, and the third butt joint plane 14 is in butt joint with the third mounting reference plane 11 in parallel. With such configuration, the positioning accuracy of the adapter 8 and the bushing bore 5 in the up-down direction can be controlled by the parallel butt joint of the first butt joint plane 12 and the first mounting reference plane 9, the positioning accuracy of the adapter 8 and the bushing bore 5 in the front-back direction can be controlled by the parallel butt joint of the second butt joint plane 13 and the second mounting reference plane 10, and the positioning accuracy of the adapter 8 and the bushing bore 5 in the left-right direction can be controlled by the parallel butt joint of the third butt joint plane 14 and the third mounting reference plane 11. The structure thus can further ensure the coaxial accuracy of the shaft sleeves 4 on the left and right sides when assembled on the support arm 1 with the adapter 5, thereby ensuring the smooth rotation of the light head of the stage light fixture.

Referring back to FIGS. 8 and 9, an integrally formed mounting plate 15 perpendicular to the direction of the axis of rotation of the universal frame 27 relative to the bottom base 25 is provided at the upper end of each longitudinal frame plate 3, with the top plate surface of the mounting plate 15 perpendicular to the length direction of the longitudinal frame plate 3, and the first mounting reference plane 9 formed on the plate surface of the mounting plate 15. In addition, both ends of the plate surface of the mounting plate 15 are vertically projected to form first limiting steps 16, with the projecting direction of the first limiting step 16 perpendicular to the surface of the mounting plate 15, and the second mounting reference plane 10 is formed on the inner side surface of first limiting step 16. An integrally formed second limiting step 17 is further provided at the end of the longitudinal frame plate 3, with the top surface of the second limiting step 17 parallel to the direction of the axis of rotation of the universal frame 27 relative to the bottom base 25, and third mounting reference plane 11 is formed on top surface of the second limiting step 17. In manufacturing, the top plate surface of the mounting plate 15, the side surface of the first limiting step 16 and the top surface of the second limiting step 17 are fine machined to improve the accuracy of the mounting reference plane of the longitudinal frame plate 3, so that the adapter 8 can be more accurately positioned on the longitudinal frame plate 3 and the coaxial accuracy of the shaft sleeves 4 on the left and right sides when assembled on the universal frame 27 with the bushing bore 5, thereby ensuring the smooth rotation of the light head of the stage light fixture.

Correspondingly, with reference to FIGS. 6 and 7, the bottom of the adapter 8 has a third limiting step 18 extending vertically in a direction away from the adapter 8, with the first butt joint plane 12 formed on the step end surface of the third limiting step 18 and the second butt joint plane 13 formed on the step outer side surface of the third limiting step 18. The step end surface of the third limiting step 18 continues to extend vertically downwards to form a vertical plate 19, with the third butt joint plane 14 formed on the inner side plate surface of the vertical plate 19. When the adapter 8 is assembled to the end of the longitudinal frame plate 3, the top surface of the third limiting step 18 is in parallel butt joint with the plate surface of the mounting plate 15, the side surface of the third limiting step 18 is in butt joint with the side surface of the first limiting step 16 in parallel, and the inner side plate surface of the vertical plate 19 is in butt joint with the top surface of the second limiting step 17 in parallel, thus ensuring the accurate positioning of the adapter 8 in up-down direction, front-back direction, and left-right direction. Similarly, during manufacturing, the top surface of the third limiting step 18, the side surface of the third limiting step 18 and the inner side plate surface of the vertical plate 19 are fine machined, so that the mounting accuracy of the adapter 8 can be improved and the adapter 8 can be more accurately positioned on the longitudinal frame plate 3 to ensure the smooth rotation of the light head of the stage light fixture on the shaft sleeve 4.

As shown in FIGS. 5-9, the number of the first limiting step 16 is two, and the two first limiting steps 16 are integrally formed at two opposite ends (front and rear ends) of the mounting plate 15, and when the adapter 8 is assembled to the end of the longitudinal frame plate 3, the third limiting step 18 at the bottom of the adapter 8 is located between the two first limiting steps 16, and the two first limiting steps 16 are in butt joint with the side surfaces of the front and rear sides of the third limiting step 18 in parallel respectively, so that the third limiting step 18 is clamped between the two first limiting steps 16 to effectively limit the forward and backward movement of the adapter 8 on the longitudinal frame plate 3.

As shown in FIGS. 6-9, according to an embodiment, the mounting plate 15 and the third limiting step 18 are respectively provided with a plurality of first screw holes 21, and the direction of the central axis of each first screw hole 21 is parallel to the length direction of the longitudinal frame plate 3. In addition, the second limiting step 17 and the vertical plate 19 are each provided with a second screw hole 22, and the direction of the central axis of the second screw hole 22 is perpendicular to the length direction of the longitudinal frame plate 3. When the adapter 8 is assembled to the longitudinal frame plate 3, the first screw hole 21 on the mounting plate 15 coaxially corresponds to the first screw hole 21 on the third limiting step 18, and the second screw hole 22 on the second limiting step 17 also coaxially corresponds to the second screw hole 22 on the vertical plate 19, so that the adapter 8 can be positioned and fixed on the longitudinal frame plate 3 by introducing screws into each set of the corresponding first screw hole 21 and second screw hole 22. Therefore, the movable support arm of the light head of the stage light fixture is assembled in such easy way.

Figure 11:
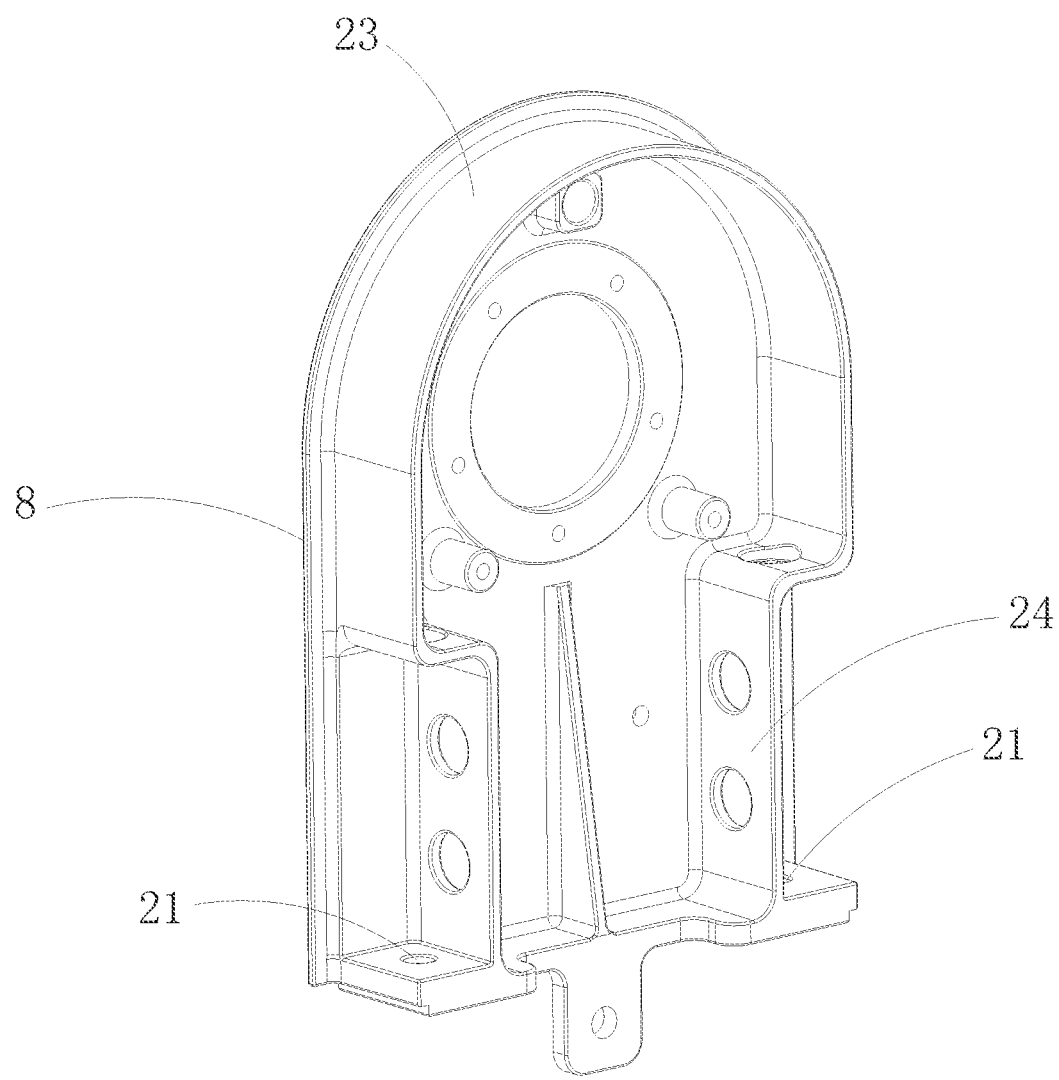
FIG. 11 is another structural view of the adapter according to an embodiment of the present the invention.
Figure 12:
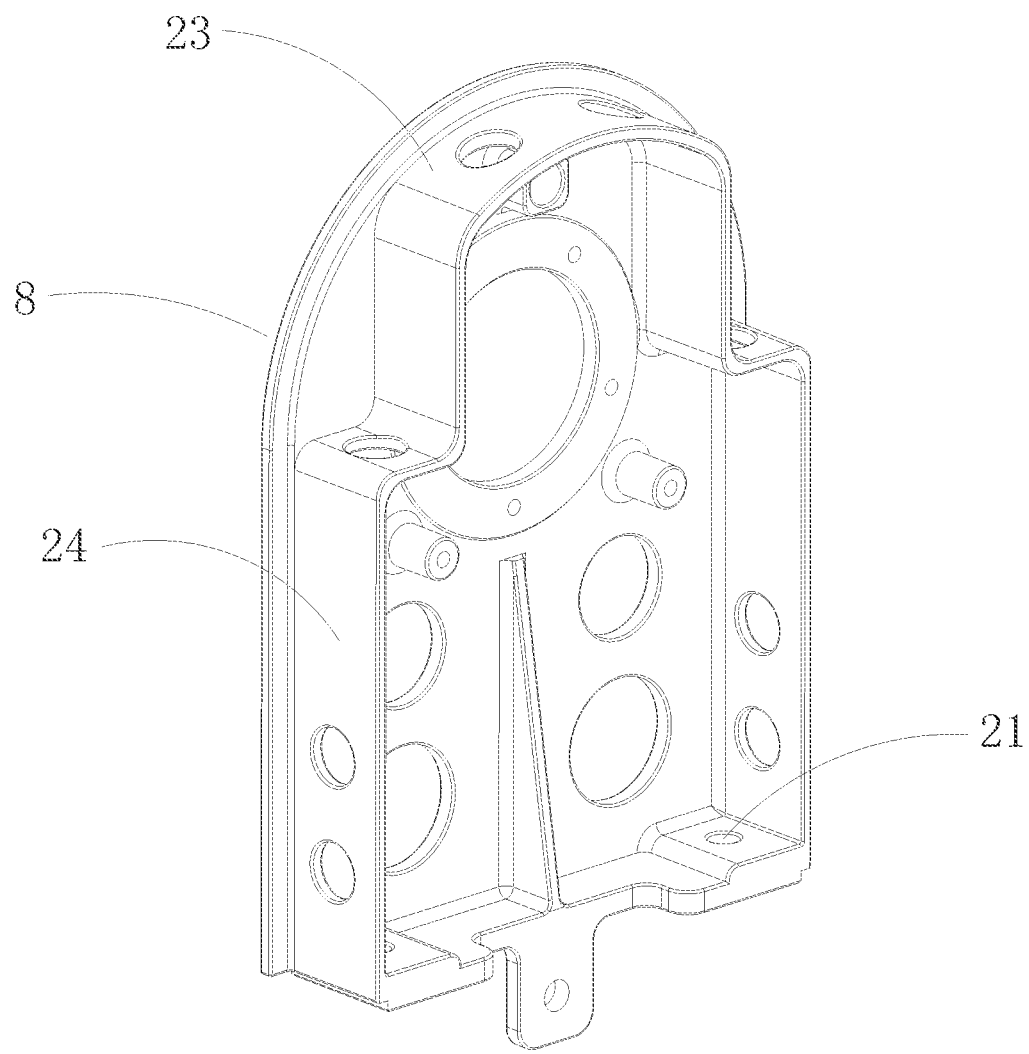
FIG. 12 is another structural view of the adapter according to an embodiment of the present the invention.

In combination with FIG. 6, FIG. 11 and FIG. 12, according to an embodiment, an annular reinforcing plate 23 is integrally molded on the side surface of the adapter 8, and the upper portion of the annular reinforcing plate 23 is in a shape of an arc to ensure the structural strength of the adapter 8.

Alternatively or additionally, the height dimension of the adapter 8 is increased with the design of annular reinforcing plate 23, in order to ensure the structural strength of the adapter 8, an extending plate 24 is also integrally molded at the lower two ends of the annular reinforcing plate 23.

Referring back to FIG. 2, a plurality of reinforcing ribs 26 are further integrally formed on the universal frame 27 to improve the structural strength thereof.

It should be noted that the foregoing embodiments are merely used for describing the technical solutions of the present invention, but are not intended to limit the present invention. Although the present invention is described in detail with reference to the foregoing embodiments, a person of ordinary skill in the art should understand that, modifications may still be made to the technical solutions in the foregoing embodiments, or equivalent replacements may be made to some of the technical features; and these modifications or replacements will not cause the essence of corresponding technical solutions to depart from the spirit and scope of the technical solutions in the embodiments of the present invention.

What is claimed is:

1. A stage light fixture with a universal support arm, comprising:
   a support arm, which is supported on a bottom base and rotatable relative to the bottom base, the support arm having a universal frame and a plurality of pairs of adapters with different total heights from one another pair in a length direction of the universal frame, wherein adapters of each pair have equal total height, wherein a pair of adapters of the plurality of pairs of adapters are selected and replaceably and detachably attached to an upper most surface of both ends of the universal frame, respectively, wherein the universal frame is of an integrally formed structure; and
   a light head, which is coupled to the selected pair of adapters via a respective rotating shaft and rotatable relative to the support arm, a light source being disposed in the light head.

2. The stage light fixture according to claim 1, wherein the rotating shaft is provided on the light head, and a shaft sleeve fitting with the rotating shaft is provided on each adapter.

3. The stage light fixture according to claim 2, wherein each adapter is provided with a bushing bore, an inner wall of the bushing bore is formed with an annular mounting reference plane fitting with an outer side wall of the shaft sleeve.

4. The stage light fixture according to claim 2, wherein the shaft sleeve is detachably fixed to the suitable adapter.

5. The stage light fixture according to claim 2, wherein a length of the shaft sleeve is adjustable in a direction of the rotating shaft.

6. The stage light fixture according to claim 1, wherein the universal frame comprises:
   a transverse frame plate, pivoted to the bottom base; and
   two longitudinal frame plates, respectively arranged on both sides of the transverse frame plate;
   wherein each of the selected pair of adapters is replaceably and detachably provided on the upper most surface of the respective longitudinal frame plate in a length direction of the longitudinal frame plates.

7. The stage light fixture according to claim 1, wherein each adapter is of an integrally formed structure.

8. The stage light fixture according to claim 1, wherein a first mounting reference plane, a second mounting reference plane, and a third mounting reference plane which are perpendicular to each other in a three-dimensional space are formed on the universal frame;
   a first butt joint plane, a second butt joint plane, and a third butt joint plane which are perpendicular to each other in the three-dimensional space are formed on each adapter; and
   wherein the first butt joint plane of the suitable adapter is in butt joint with the first mounting reference plane in parallel, the second butt joint plane of the suitable adapter is in butt joint with the second mounting reference plane in parallel, and the third butt joint plane of the suitable adapter is in butt joint with the third mounting reference plane in parallel.

9. The stage light fixture according to claim 8, wherein an end of the universal frame has a mounting plate perpendicular to a direction of an axis of rotation of the universal frame relative to the bottom base, and the first mounting reference plane is formed on a surface of the mounting plate;
   the first limiting step is projected vertically from both ends of the surface of the mounting plate, and the second mounting reference plane is formed on an inner side surface of the first limiting step; and
   wherein the end of the universal frame has second limiting steps extending in a direction close to the bottom base, a top surface of the second limiting step is parallel to the direction of the axis of rotation of the universal frame relative to the bottom base, and the third mounting reference plane is formed on a top surface of each second limiting step.

10. The stage light fixture according to claim 8, wherein a bottom of each adapter has a third limiting step extending vertically in a direction away from the adapter, the first butt joint plane and the second butt joint plane are respectively formed on a step end surface and a step outer side surface of the third limiting step, the step end surface of the third limiting step has a vertical plate extending vertically in a direction close to the bottom base, and the third butt joint plane is formed on a surface of the vertical plate.

11. The stage light fixture according to claim 1, wherein the universal frame of integrally formed structure is molded by casting, turn milling or 3D printing.

\* \* \* \* \*